Oct. 17, 1967  J. P. SOROOS ET AL  3,347,591
LIFT AND LOCATOR ASSEMBLY FOR CAMPING TRAILER KITCHEN UNIT
Filed Feb. 20, 1967
3 Sheets-Sheet 1

INVENTORS:
JAMES P. SOROOS
PATRICK J. REGAN
BY: *Dawson, Tilton, Fallon, Lungmus & Alexander*
ATT'YS

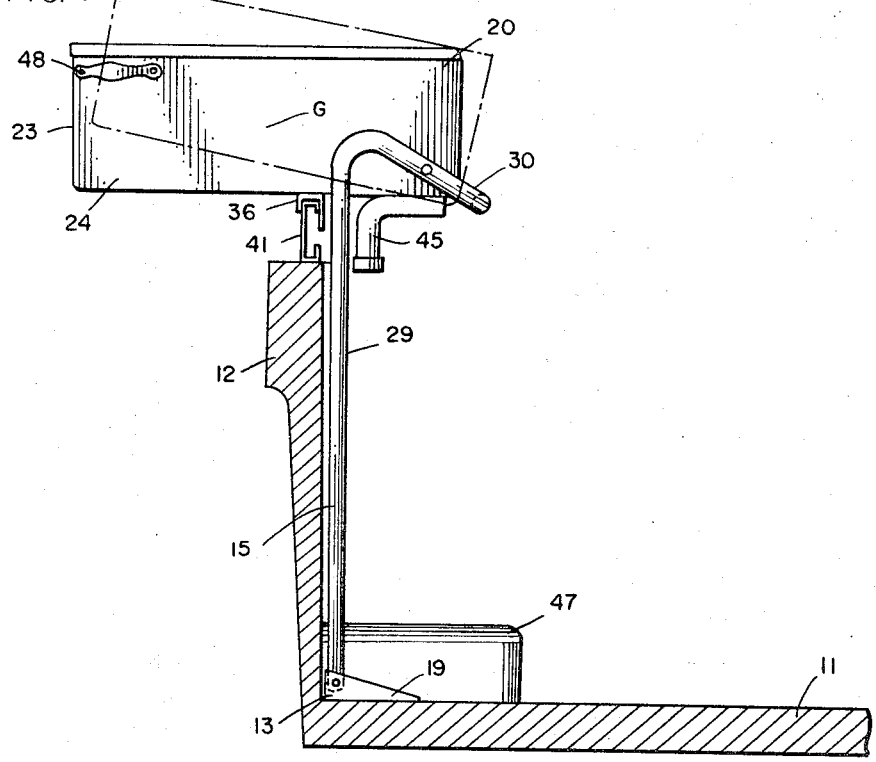
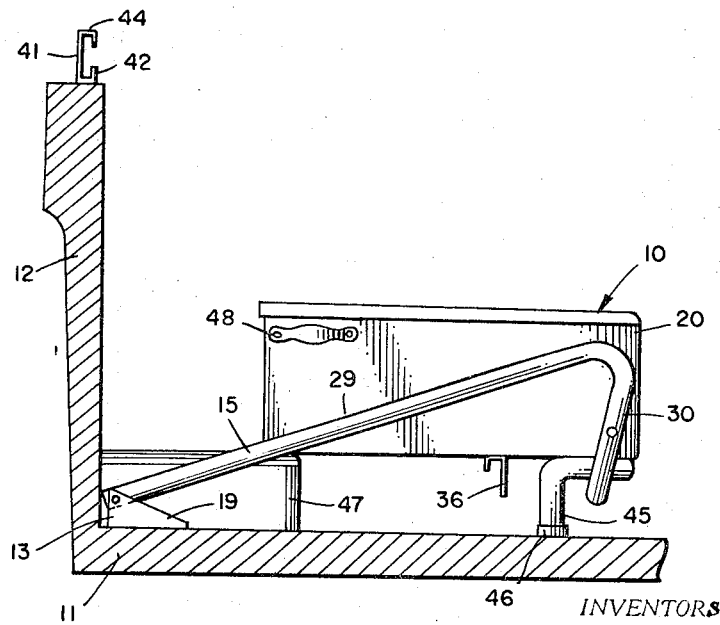

Oct. 17, 1967   J. P. SOROOS ETAL   3,347,591
LIFT AND LOCATOR ASSEMBLY FOR CAMPING TRAILER KITCHEN UNIT
Filed Feb. 20, 1967                               3 Sheets-Sheet 3
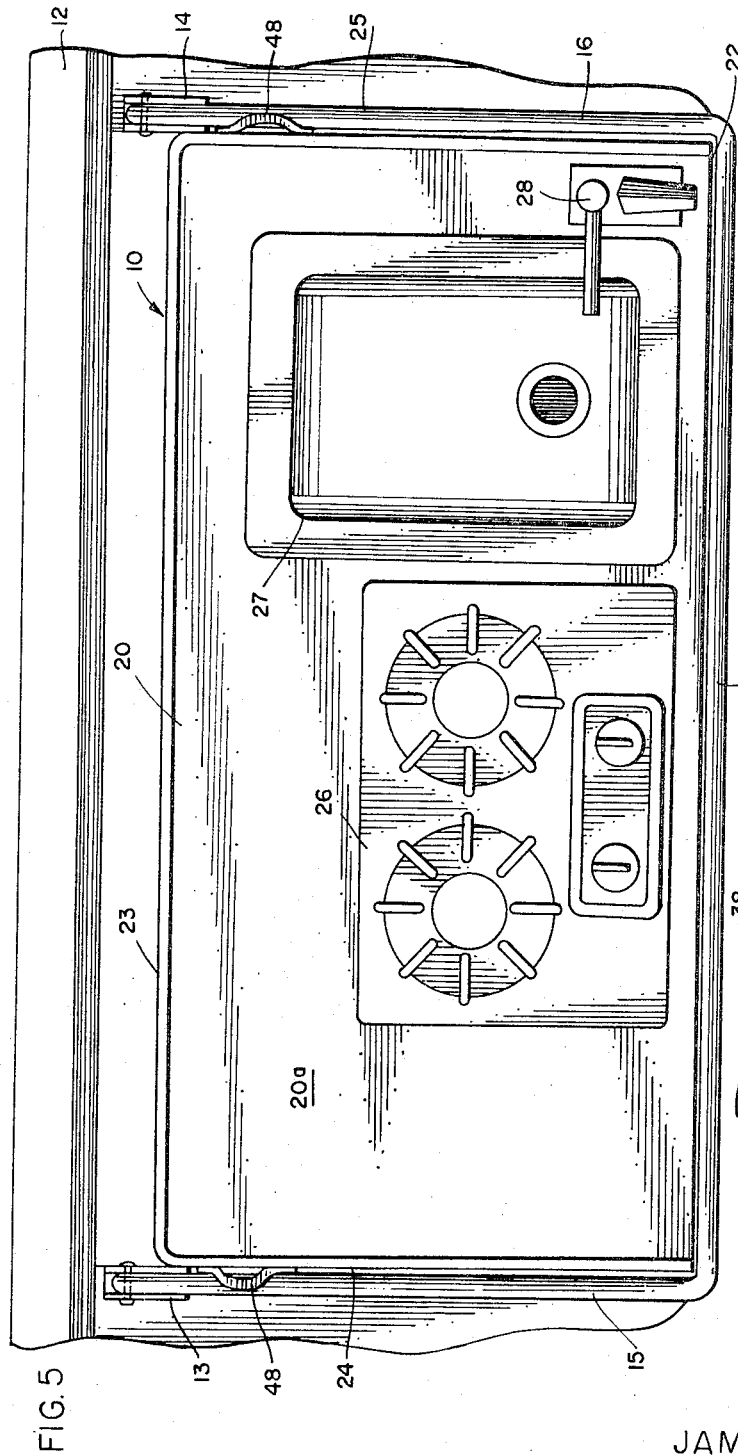
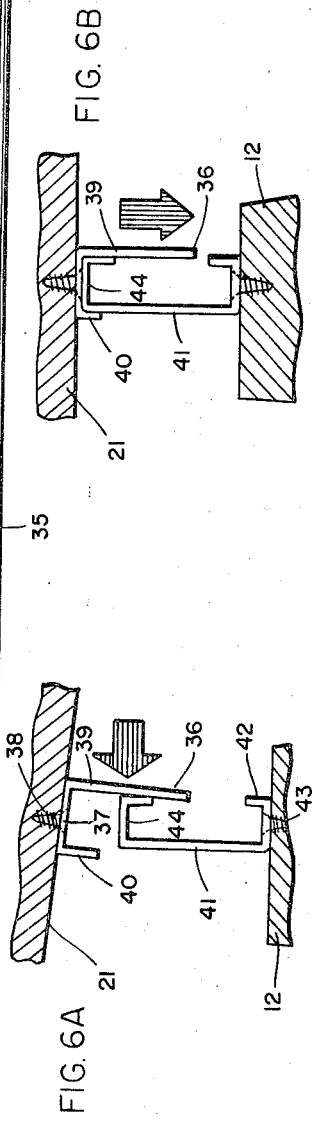
INVENTORS:
JAMES P. SOROOS
PATRICK J. REGAN
BY: Dawson, Tilton, Fallon, Lungmus & Alexander
ATT'YS

United States Patent Office 3,347,591
Patented Oct. 17, 1967

3,347,591
LIFT AND LOCATOR ASSEMBLY FOR CAMPING TRAILER KITCHEN UNIT
James P. Soroos, Columbus, Ohio, and Patrick J. Regan, Wauwatosa, Wis., assignors to The Coleman Company, Inc., Wichita, Kans., a corporation of Kansas
Filed Feb. 20, 1967, Ser. No. 617,407
8 Claims. (Cl. 296—23)

ABSTRACT OF THE DISCLOSURE

Lift and locator assembly for camping trailer kitchen units which permits a fold-away kitchen unit to be maintained generally horizontal at all times and which enables the unit to be quickly and accurately moved to a stable use position. The unit may be maintained in a horizontal storage position on the trailer floor until it is to be used, at which time it may be swung upwardly about supporting legs which are pivotally secured to the unit and to the floor and which help to support the unit while it is being raised. A locator bracket depending from the bottom of the unit engages a side rail extending from the side wall of the trailer when the unit has reached the proper use position, and the unit is then lowered slightly to engage the locator bracket with the side rail.

Background of the invention

This invention relates to kitchen units for use in camping trailers, which are used by vacationers, hunters, and the like. More particularly, the invention relates to a kitchen unit which may be stored on the floor of the camping trailer when the trailer is being pulled by an automobile and which, when the vacationer desires to set up camp, may easily be swung upwardly and outwardly to be positioned in somewhat cantilever fashion on the side wall of the trailer. One of the desirable features of camping trailers is that, when not in use, they may be folded into a relatively compact package which may be readily pulled by even a small car. This compactness is achieved by providing bunks, tables, etc. which may rotate or slide from a storage position within the confines of the stationary side walls of the trailer to positions extending beyond the side walls. Bunk beds, for example, may be hingedly secured to opposite side walls of the trailer and positioned within the trailer walls when the trailer is being pulled. When the camp site is reached, the bunk beds may be rotated through 180°, and detachable legs may be secured which support the portion of the bunk bed extending beyond the trailer walls. Rather than being hingedly secured to the side walls, the bunk beds may be slidably secured so that when they are desired to be used, they may be slid from a position within the trailer walls to a position overhanging the trailer walls. Again, detachable legs may be used to support the overhanging portion of the bunk beds.

Kitchen units have also been provided which swing from a storage position within the trailer to a use position above a side wall of the trailer. In the use position the kitchen unit may extend substantially beyond the side wall so that more living area is available within the trailer walls.

However, in the past these units have ordinarily been stored so that the top of the kitchen unit generally extends vertically. It is desirable to provide folding kitchen units which may be maintained in generally horizontally in the storage position so that dishes, cups, food, or the like may be stored on the counter top or shelf of the kitchen unit without fear of spilling. The unit should also be capable of maintaining a generally horizontal position when it is swung from the storage position to the use position so that the contents of the shelf need not be removed.

Previous folding kitchen units have also suffered from the disadvantages of being too cumbersome for a housewife or child to lift and properly position so that the unit may be secured in a stable manner on the trailer wall.

Summary of the invention

Applicants' lift and locator assembly enables a kitchen unit to be stored in a generally horizontal manner, and easily lifted and swung to the use position, prevents the unit from going beyond its use position, and then locks the unit in a stable manner. The assembly includes uniquely shaped support legs which support much of the weight of the unit while it is being swung to the use position and which securely maintain the unit in the use position. The unit includes a depending channel-shaped locator bracket which engages the side rail on the trailer side wall when the unit reaches the proper position and prevents the unit from swinging beyond that position. After the locator bracket engages the side rail, the unit is slightly lowered so that the side rail is received within the locator bracket and the unit is releasably locked in place. Even though a substantial portion of the kitchen unit extends beyond the side wall and the center of gravity of the unit is outside of the trailer, the unit cannot tip to the outside of the trailer because it is restrained by the support legs which are secured to the unit. The unit cannot tip to the inside of the trailer because of the location of the center of gravity of the unit. Even if the user of the kitchen unit should apply a downward force to the unit, the unit will not tip to the inside of the trailer floor because it is supported by the support and locator brackets and the support legs.

Description of drawing

FIG. 3 is a view showing the unit in the use position;

FIG. 4 is a view similar to FIG. 3 showing the unit in the storage position;

FIG. 5 is a top plan view of the kitchen unit in the storage position;

FIG. 6A is a fragmentary sectional view showing the locator bracket as it engages the support bracket; and FIG. 6B is a view similar to FIG. 6A showing the locator bracket being lowered about the support bracket.

Description of preferred embodiment

Figure 1:
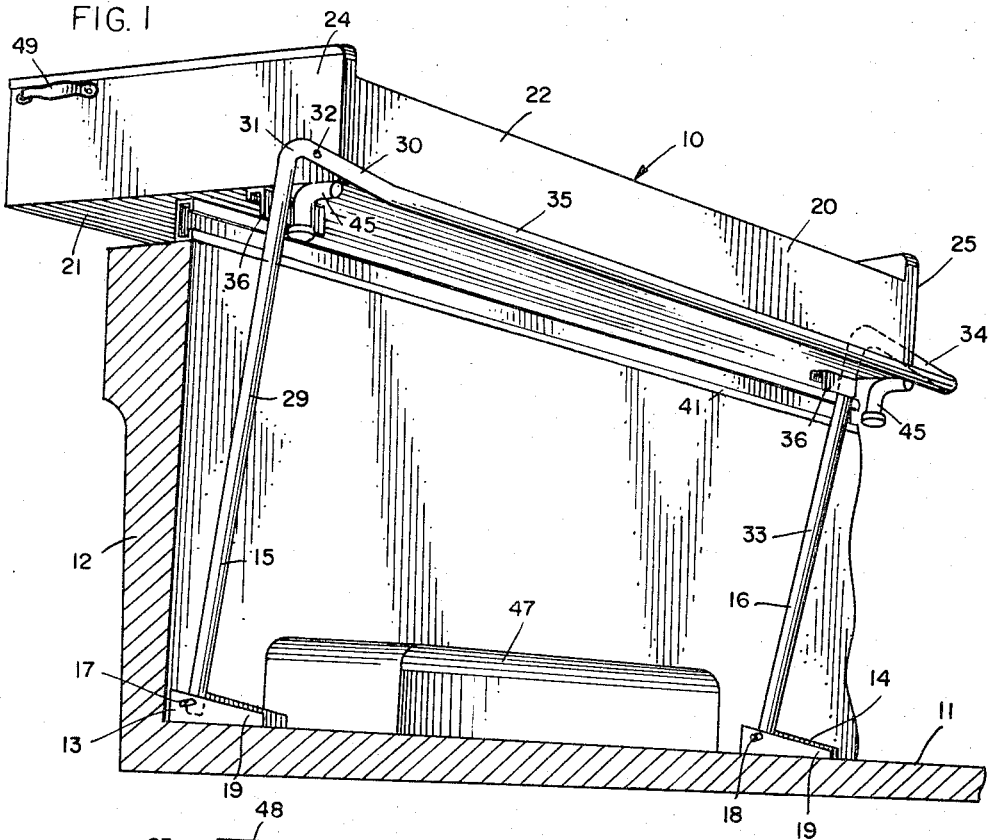
FIG. 1 is a fragmentary perspective view showing the kitchen unit in the process of being raised to the use position.

Referring now to FIG. 1, the numeral 10 designates generally a galley or kitchen unit mounted within a camping trailer having a floor 11 and an upwardly extending side wall 12. Although only one side wall 12 is shown, it is to be understood that camping trailers are generally completely enclosed by four side walls. Floor brackets 13 and 14 are secured to floor 11 adjacent wall 12, and support legs 15 and 16 are pivotally attached to floor brackets 13 and 14 by pins 17 and 18, respectively. Floor brackets 13 and 14 are advantageously channel shaped so that the support legs may be received therein and include a leg portion 19 extending inwardly from the trailer wall 12 in order to firmly anchor the bracket to the floor.

Kitchen unit 10 is seen to include an elongated box-like counter 20 having a bottom 21, front 22, back 23, and sides 24 and 25. Referring to FIG. 5, counter 20 is seen to be provided with an upper work area or shelf 20a which may include a gas burner stove 26, sink 27, and hand pump water faucet 28.

Referring again to FIG. 1, support legs 15 and 16, which may be advantageously made of aluminum or other suitable metal tubing, are spaced slightly wider than the distance between counter sides 24 and 25. Support leg 15 includes an elongated outer or major portion 29 which extends from bracket 13 to side wall 24 and an inner or arm portion 30 which is provided by a reverse bend as at 31 so that it extends at an acute angle from major portion 29. Arm portion 30 is pivotally secured to counter 20 by pin 32. Similarly, support leg 16 includes major portion 33 and arm portion 34 which is pivotally secured to side wall 25 of counter 20. Although, support legs 15 and 16 may be provided individually, they may also be provided from a single piece of tubing in order to provide towel rack or front guard 35 which joins the arm portions 30 and 34. Depending from counter bottom 21 adjacent each of the counter sides 24 and 25 are locator brackets 36. Referring to FIGS. 6A and 6B, locator bracket 36 is seen to be generally channel-shaped and includes a web portion 37 which is secured to counter bottom 21 as by screw 38. Extending perpendicularly from the end of web 37 near counter front 20 is inner leg portion 39, and extending from the other end of web 37 is outer leg portion 40. Inner leg portion 39 is seen to be substantially longer than outer leg portion 40.

Referring to FIGS. 4 and 6A, extending upwardly from trailer wall 12 and secured to the top thereof is side rail 41. The side rail extends around all sides of the trailer and also serves to support the trailer cover when the trailer is being pulled. The side rail 41 is seen to be generally C-shaped and includes a foot portion 42 which is secured to trailer wall 12 as by screw 43 and head portion 44. The width of head portion 44 is slightly less than the spacing between inner and outer leg portions 39 and 40 of locator bracket 36.

Also attached to counter bottom 21 and depending therefrom are rest bars 45. Rest bars 45 may be conveniently made of metal tubing which is bent to form an elbow. The downwardly extending portion of the elbow may be fitted with a protective safety cap 46 (see FIG. 4). Rest bar 45 is secured to the counter bottom adjacent each of the counter walls 24 and 25 forwardly of the locator brackets.

A saving in space may be achieved if the support legs 15 and 16 are secured to the trailer floor so that they straddle one of the wheel well covers 47 of the trailer, and lifting handles 48 may conveniently be secured to the sides 24 and 25 of the counter. Although the handles 48 may be positioned anywhere along the counter sides, it has been found that they are preferably secured adjacent the back 23 of the counter.

Operation

When the camping trailer is not in use, the kitchen unit 10 may be conveniently maintained in the storage position shown in FIG. 4. The counter 20 is supported at the front thereof by rest bars 45 and at the rear by wheel well cover 47. Thus, not only may the kitchen unit be positioned in the space frequently rendered unusable by the wheel well, the unit may use the wheel well cover for partial support. However, it is to be understood that if the kitchen unit were positioned away from the wheel well, another depending rest bar could be secured to the rear of the counter bottom 20. Rest bars 45 may also be eliminated and arm portions 30 and 34 of the supporting legs 15 and 16 could be used to support the counter in the storage position.

Figure 2:
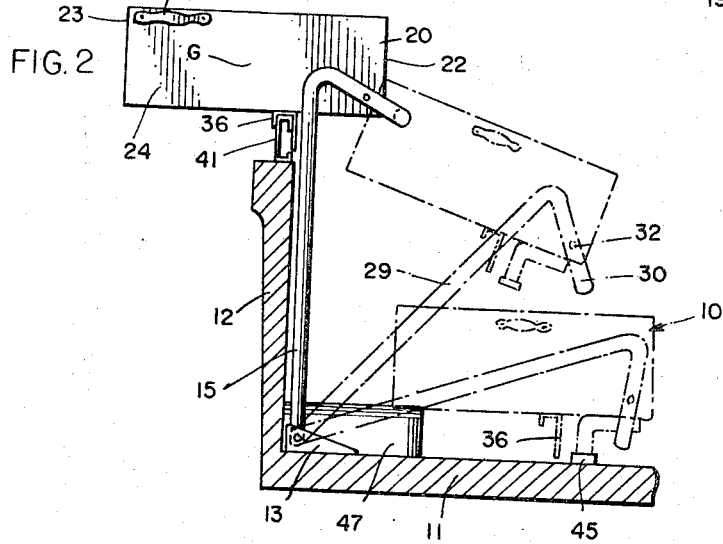
FIG. 2 is a fragmentary elevational view partly in cross section showing the kitchen unit in the storage position, the use position, and an intermediate position.

When the trailer reaches the camp site and the kitchen unit is desired to be used, it may easily be swung into the use position about support legs 15 and 16. The steps of moving the kitchen unit from the storage position to the use position is illustrated in FIG. 2. The operator grasps the convenient lifting handles 48 and exerts an upward and outward (with respect to the trailer) lifting force. Almost as soon as the unit begins rotating about floor brackets 13 and 14, the weight of the kitchen unit becomes partially supported by support legs 15 and 16. The higher the unit is raised, the more weight that is supported by the support legs. The kitchen unit may also be rotated with respect to the support legs about pivot points 32 as the support legs are rotated upwardly so that the kitchen unit may be maintained in a generally horizontal manner. Thus, any dishes or food which are stored on the counter top or shelf 20a or in the sink 27 will be retained thereon.

Referring now to FIGS. 3 and 6A as the counter is swung over side wall 12, it is maintained in a slightly inclined position so that the outer legs 40 of the locator brackets 36 may pass over side rail 41. However, inner leg portions 39 of the locator brackets will engage the side rail (as shown by the arrow in FIG. 6A) and prevent further outward rotation of the kitchen unit. The counter is then positioned correctly above the trailer wall and may then be lowered as shown by the arrow in FIG. 6B so that locator brackets 36 receive the side rail 41. The locator brackets are preferably sized so that head portion 44 of the side rail is snugly received between the inner and outer leg portions of the locator brackets.

In the use position the side rail is received in the locator brackets. The support legs 15 and 16 extend generally perpendicular to the trailer floor, and the counter 20 is generally horizontal (see FIGS. 2 and 3). In this position an outer portion of the counter extends substantially beyond the trailer wall but is nevertheless securely supported in a stable position. Even though the center of gravity of the counter may be located beyond the trailer wall, the counter cannot tip to the outside about side rail 41 because it is restrained by the pivotal connections of arm portions 30 and 34 of the support legs to the inner portion of the counter. The reverse bends of the arm portions serve to prevent outward rotation about the side rail. The counter cannot tip to the inside of the trailer even if a substantial force is inadvertently applied to the counter top because of the very short moment arm between pivotal connections 32 and counter front wall 22 as compared to the substantial moment arm between the pivotal connections 32 and the center of gravity of the kitchen unit, indicated approximately as at G. The relatively snug fit of the side rail 41 within the locator brackets 36 also serves to inhibit movement of the unit while it is in the use position.

Although in the preferred embodiment, two locator brackets are secured to the counter bottom adjacent the counter sides, it is to be understood that a single locator bracket located between the counter sides may also be used.

From the foregoing it is seen that a lift and locator assembly has been provided which enables a kitchen unit of a camping trailer to be stored horizontally, lifted generally horizontally, and secured in a use position generally horizontally. The unique support legs support a substantial amount of the weight of the kitchen unit as it is being lifted in the use position, and the locator brackets indicate when the unit has reached the proper position and prevent the unit from traveling therebeyond. The cooperation of the locator brackets with the side rail also serves to secure the kitchen unit in a stable manner as does the unique shape of the support legs.

While in the foregoing specification, a detailed description of the preferred embodiment of the invention was set forth for the purpose of explanation, it is to be understood that many of the details herein given may be varied considerably by those skilled in the art without departing from the spirit and scope of the invention.

We claim:
1. In combination with a camping trailer including an interior floor connecting to an upwardly extending side wall having a top and inner and outer sides, a kitchen unit comprising:

(a) counter means providing an upper work area, said counter means having outer and inner portions and being manually moveable between a storage position adjacent said floor and the inner side of said wall and a use position over the top of said wall in which said outer portion of said counter means extends outwardly beyond the outer side of said side wall;

(b) support rail means mounted on the top of said side wall for cooperation with said counter means in said use position;

(c) support leg means extending between the inner portion of said counter means and the area of said trailer interior near the connection between said floor and said side wall, said support leg means being provided with pivot mountings respectively connecting its inner end to said counter inner portion and its outer end to said trailer interior area so that said counter means with its weight partially supported by said leg means can be moved between said storage and use position;

(d) and locator bracket means mounted on the inner side of said counter means and arranged for coaction with said support rail means, said locator bracket means releasably engaging said rail means in said use position to locate and support said counter means.

2. The combination of claim 1 wherein said locator bracket means includes spaced leg portions for engaging respectively the inner and outer sides of said rail means.

3. The combination of claim 2 wherein the inner of said leg portions extends downwardly for a substantially greater length than the outer of said leg portions.

4. The combination of claim 1 wherein in said storage position as well as in said use position the pivot mountings at the inner end of said leg means are located at a higher elevation than the pivot mountings at the outer ends thereof.

5. The combination of claim 4 wherein said locator bracket means includes inner and outer spaced leg portions for engaging respectively the inner and outer sides of said rail means, said inner leg portion extending downwardly for a substantially greater length than the outer leg portion.

6. The combination of claim 4 wherein said trailer includes a wheel well cover extending upwardly from said floor, said counter means being supported by said wheel well cover when in the storage position.

7. The combination of claim 4 wherein the outer end and the inner end of said support leg means define an included angle of less than 90°.

8. The combination of claim 5 wherein said trailer includes a wheel well cover extending upwardly from said floor, said counter means being supported by said wheel well cover when in the storage position, the outer end and the inner end of said support leg means defining an included angle of less than 90°.

References Cited

UNITED STATES PATENTS

| | | | |
|---|---|---|---|
| 1,305,624 | 6/1919 | Schneider | 4—169 |
| 1,682,695 | 8/1928 | Miner. | |
| 1,857,081 | 5/1932 | Fontaine. | |
| 1,881,482 | 10/1932 | Gilkison. | |
| 2,193,352 | 3/1940 | Thomas. | |
| 2,572,151 | 10/1951 | Hoppe. | |
| 2,626,850 | 1/1953 | Slonneger | 312—140.4 |
| 2,829,940 | 4/1958 | Stuck. | |
| 3,081,138 | 3/1963 | Stebbins. | |
| 3,115,362 | 12/1963 | Spurrier. | |
| 3,177,030 | 4/1965 | Anderson. | |
| 3,288,521 | 11/1966 | Patnode. | |
| 3,292,966 | 12/1966 | Mariol. | |

BENJAMIN HERSH, *Primary Examiner.*

P. GOODMAN, *Assistant Examiner.*